May 6, 1930.  G. CHRISTENSON  1,757,005
HEAVY DUTY SWAB
Filed April 18, 1928
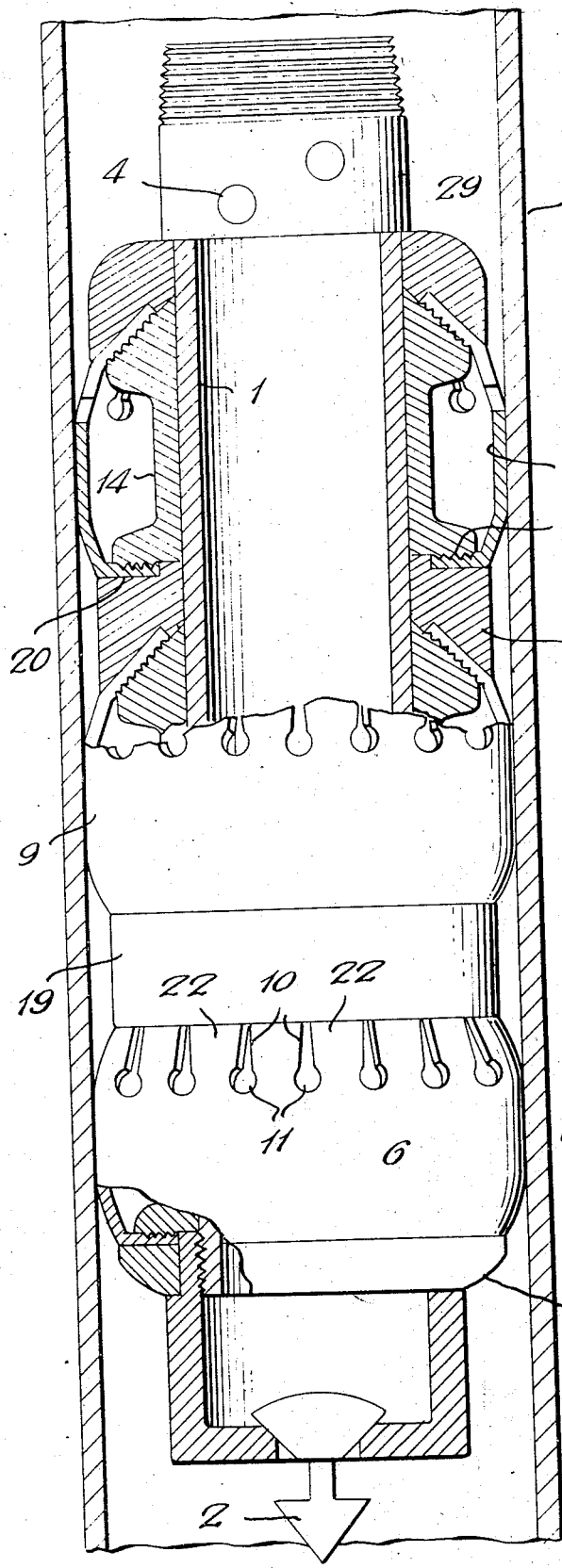
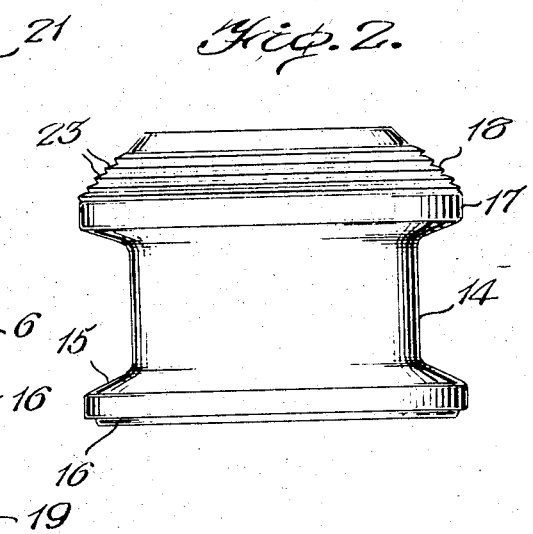
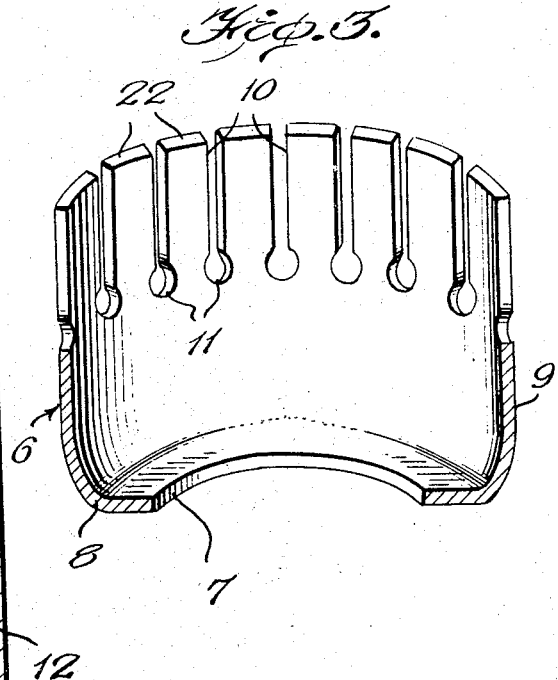
Inventor
George Christenson
By Roberts Cushman & Woodberry
Attorneys Patented May 6, 1930

1,757,005

UNITED STATES PATENT OFFICE

GEORGE CHRISTENSON, OF NORTH PLAINFIELD, NEW JERSEY, ASSIGNOR TO JOHNS-MANVILLE CORPORATION, OF NEW YORK, N. Y., A CORPORATION OF NEW YORK

HEAVY-DUTY SWAB

Application filed April 18, 1928. Serial No. 270,901.

This invention relates to heavy duty swabs and to packing therefor, and particularly to devices of this character suitable for oil wells or similar locations, wherein it is necessary to provide a substantially fluid-tight seal under great pressures and despite irregularities in the wall of the conduit which is engaged by the swab. Tubular well casings, when carried to a considerable depth, are ordinarily characterized by irregular surfaces which are adapted to abrade and seriously injure the swab cups or packing elements which engage them. Furthermore, it is particularly difficult to maintain the packing in proper engagement with walls of this character, since the clearance space about the packing varies and the wall itself is rough and irregular.

The present invention is designed to afford a longer-lived and more effective swab for this purpose, particularly providing a packing or swab cup arrangement which is adapted to withstand the unusually severe abrasive action, blows and stresses resulting from use in oil wells and to maintain a satisfactory, substantially fluid-tight joint under these conditions.

Objects, among others, of this invention are therefore to provide a lifting plunger or swab which is adapted to maintain a substantially fluid-tight connection with the interior surface of an oil well casing or cylinder of variable and imperfect mechanical construction, to provide a swab packing protected against mutilation by the irregularities of the interior surface of the well casing, and, in general, to improve upon the operative efficiency and durability of devices of this character. For these purposes, in its more specific aspect, the present invention provides packing members or swab cups which are formed with quite flexible or yieldable walls, being supported both at their upper and lower ends in such a manner that during the upward movement of the plunger the flexible walls may be expanded outwardly to maintain yieldable engagement with the well casing, while during the downward movement of the casing the cup tends to contract away from the walls of the casing, thus avoiding unnecessary friction upon the downward stroke. Furthermore, the packing material may be unusually tough and particularly able to withstand the abrasive and bruising action of the rough, imperfectly formed surface of the well casing upon the expanded packing member, such material also being able to resist the chemical action of the various grades of oil which are met in various localities and which cause deterioration of the conventional swab cup material.

In the accompanying drawings, which exemplify one embodiment of the invention:

Fig. 1 is a view partially in elevation and partially in section illustrating a swab constructed in accordance with the present invention;

Fig. 2 is a side elevational view of a spacer member adapted to engage the upper and lower portions of a swab cup; and Fig. 3 is a view partially in section and partially in perspective of a portion of a packing member or swab cup as it is preformed and before it is assembled with the swab.

A swab of the character disclosed in the accompanying drawings may comprise a central support or hollow plunger 1 which has a weighted inlet valve 2 at its lower end and outlet ports 4 at its upper end, the entire assembly being adapted to be raised by a suitable wire cable or the like (not shown). A plurality of packing members 6 are carried upon the swab to enable it to lift a quantity of fluid during its upward movement.

Cups 6 preferably have walls formed of comparatively flexible, somewhat resilient material, certain types of leather being particularly suitable for this purpose. The lower portions of the cups preferably are preformed, Fig. 3, being provided with a central opening 7 and a dished or concavo-convexly curved portion 8 which merges into an upright wall 9. The upper edge of this wall preferably is broken up by a plurality of downwardly extending slots 10. If desired, the lower portions of these slots may terminate in suitable circular openings 11 with diameters somewhat greater than the widths of the slots. A portion of a cup of this character is shown more particularly in Fig. 3, it being evident that the dished bottom portion of the cup is substantially form retaining due to the manner of forming or pressing the material thereof, while each of the parallel upper extensions 22 of the cup wall may be comparatively flexible due to the slots 10 therebetween.

Cups or packing members of this character preferably are assembled upon the swab 1 by means of suitable anular retaining members which are secured or mounted upon the central support and designed to grip the upper and lower edges of the cup wall. For this purpose, I provide a lower annular ring 12 adapted to engage the outer or bottom surface of the lower cup. Within each cup is located a suitable spacing member 14, shown in elevation in Fig. 2 and in section in Fig. 1. This spacing member preferably is provided with an outstanding lower part 15 having corrugations 16 on its lower surface. The intermediate body portion of the spacer 14 preferably is arranged to be in juxtaposed parallelism to the wall of the central support 1, while its upper portion comprises an annular enlargement 17 having a surface 18 with a general upward inclination toward the central axis of the support, this inclined surface also being provided with suitable corrugations 23. The lower ring 12 is adapted to clamp the dished lower portion of the lower packing element 6 against the lower part of a spacer 14, while rings 19 are disposed between adjoining packing cups, and a retaining ring 29 engages the upper part of the upper cup. The lower portion of each ring 19 and of member 29 may be provided with a downwardly inclined rabbet with a surface adapted to parallel the upper surface 18 of a spacer 14 and to clamp the upper projections 22 of a cup wall to such a surface. Each ring 19 may also have an annular rabbet 20 paralleling the lower corrugated surface 16 of an adjoining spacer 14 and clamping the lower portion of the cup against the same.

Slots 10 are arranged to extend downwardly for a considerable distance below the upper retaining member for each cup, and the lower portions of the slots and the openings 11 comprising fluid ports which, however, are located above the intermediate parts of the respective cups. Due to the dished formation originally imparted to the lower portion of the cups 6 and due to the inclination of the surface 18 of each spacer, the intermediate portion of each of the somewhat flexible walls 9 tends to be curved outwardly. The portions 22 of the cup 10 are particularly advantageous in supporting the upper edge thereof and in permitting the flexible cup wall to be retained in position under comparatively heavy loads and stresses.

In the use of a swab cup of the character disclosed, slots 10 and openings 11 are adapted to receive fluid during the upward stroke of the plunger and to permit entrance of the same into the space about member 14 and within the cup. Thus the intermediate portion of the wall of the latter is expanded and held against the inner face of the wall of well casing 21, the flexibility of the wall material, however, permitting it to conform in a satisfactory manner to the imperfections of the surface with which it is in engagement and the leather being particularly effective in withstanding abrasions by the surface. When the plunger or swab is dropped downwardly in the opposite direction, the flexibility and yieldability of the wall 9 of each cup permits it to contract to a considerable extent as soon as it is relieved of the weight of the liquid thereabove. Accordingly friction upon the downward movement of the swab is greatly reduced and the life of the packing members accordingly increased.

It is obvious that the arrangement whereby both the upper and lower portions of the flexible wall are clamped permits the cup to be formed of material having comparatively yieldable or thin walls, this material being unusually effective in withstanding wear and chemical deterioration and in conforming to irregularities in the well casing as well as readily contracting upon the downward stroke. Furthermore, the spacer means and cooperating retaining rings permit the upper and lower portions of the cup wall to be firmly gripped and to be held in place despite the heavy loads placed thereon, such a firm gripping action being desirable due to the comparative flexibility of the cup wall itself. Obviously the arrangement of the openings or ports 11 in the cup wall not only permits the upper portion of this wall formed by extensions 11 to be flexible and therefore readily bent inward to conform to the inclination of the retaining surfaces, but also affords conveniently disposed inlet ports in the cup wall itself without requiring provision for the same within the metal members or interfering wth the firm grip upon the sheet material of the cup wall itself.

I claim:

1. In a swab, a central support, a cup formed of flexible sheet material, means upon the support securing the upper and lower portions of the cup wall to the support, the wall between said portions being spaced from the support, and openings in said cup wall near the upper portion thereof, said openings communicating with the space provided between the same and the support, and being arranged to admit liquid to the space between the cup wall and support, thereby flexing outwardly the portion of the cup wall below said openings.

2. In a swab, a central support, a cup formed of flexible sheet material, means upon the support securing the upper and lower edges of the cup wall to the support, the wall between said edges being spaced from the support, openings in said cup wall and adjoining the upper edge thereof, said openings communicating with the space provided between the cup and the support, said securing means comprising annular members providing corrugated surfaces to engage and grip the upper and lower portions of the cup wall, said surfaces which engage the upper portion of the cup wall being arranged to have a general inclination outwardly and downwardly.

3. In a swab, a central support, a cup having a flexible wall disposed about said support, means upon the support securing the upper and lower edges of the cup wall to the support, the wall between said edges being spaced from the support, and slots in said cup wall extending downwardly from the top edge thereof, the lower ends of these slots providing openings which communicate with the space provided between the same and the support.

4. In a swab, a central support, a swab cup disposed about said support, means upon the support engaging the lower portion of the cup, said cup having slots at its upper edge, means upon the support gripping and supporting the upper portions of the cup wall between said supports, said slots extending below said last-named means to provide fluid openings.

5. In a swab, a central support, a swab cup disposed about said support, said cup having a flexible wall of fibrous sheet material, means upon the support engaging the lower portion of the cup, said cup having slots at its upper edge, means upon the support gripping and supporting the upper edge of the cup wall between said supports, said slots extending below said last-named means to provide fluid openings, and retaining means arranged to hold the intermediate portion of the wall spaced from the support.

6. A swab cup comprising a sheet of flexible fibrous material having a dished bottom portion with a central opening therein, said bottom portion merging into a wall of substantially circular cross section, the upper part of said wall having a plurality of slots extending downwardly from its upper edge, whereby the separate upper parts of the wall may have considerable flexibility and may be bent inwardly to be held by a support extending through the central opening.

7. A swab cup comprising a sheet of flexible fibrous material having a dished bottom portion with a central opening therein, said bottom portion merging into an upper wall of substantially circular cross section, the upper part of said wall having a plurality of slots extending downwardly from its upper edge, the lower ends of said slots terminating in round openings with a diameter somewhat greater than the width of the slots.

8. In a swab, a central support, a cup formed of flexible sheet material and having a dished bottom portion with a central opening, the upper part of said cup being provided with slots separating the cup wall into a plurality of flexible members, said central support extending through said opening, means carried by the support securing the dished bottom portion of the cup thereto, the flexible members at the upper edge of the cup wall being bent inwardly and means securing said members to the central support, the intermediate part of the cup wall being separated from the support, the lower parts of said slots providing openings to permit liquid to enter into the space between the cup wall and support to flex the former outwardly.

In testimony whereof I affix my signature.
GEORGE CHRISTENSON.